(No Model.)
C. D. FLYNT.
JOURNAL BOX.
No. 572,882. Patented Dec. 8, 1896.
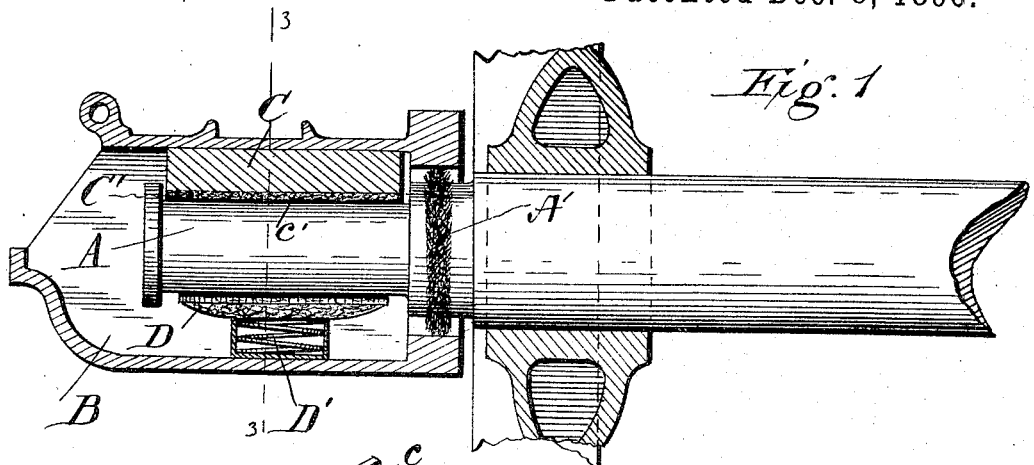
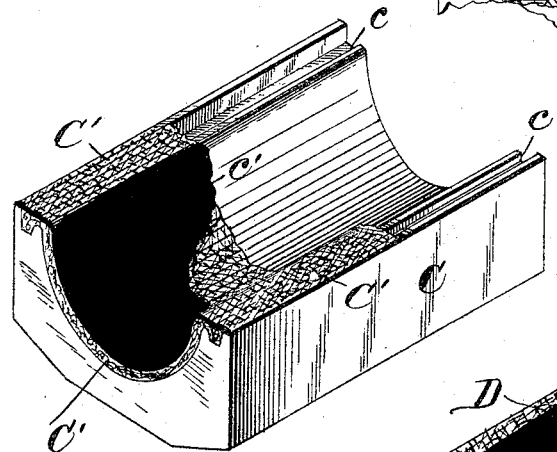
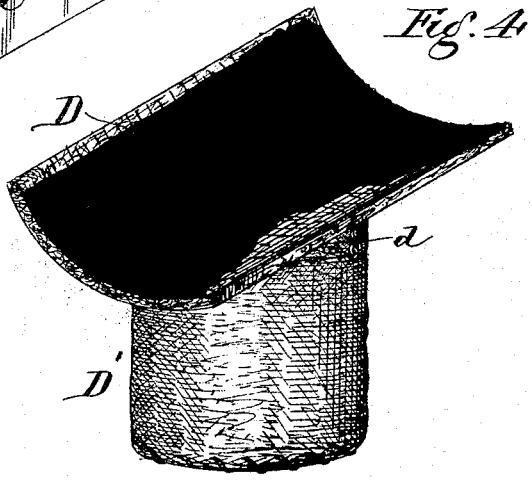
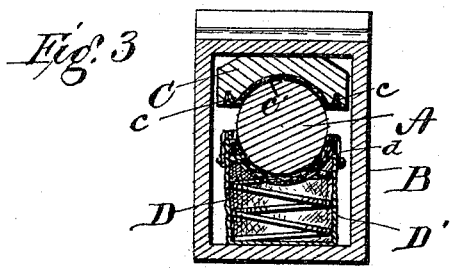
Witnesses
Franck L. Ouraud
L. A. Hartman
Inventor
Chester D. Flynt,
per E. W. Bradford
Attorney
THE NORRIS PETERS CO., PHOTO-LITHO., WASHINGTON, D. C.

UNITED STATES PATENT OFFICE.

CHESTER D. FLYNT, OF BROOKLYN, NEW YORK, ASSIGNOR OF ONE-HALF TO JOHN T. JONES, OF SAME PLACE.

JOURNAL-BOX.

SPECIFICATION forming part of Letters Patent No. 572,882, dated December 8, 1896.

Application filed September 22, 1896. Serial No. 606,671. (No model.)

*To all whom it may concern:*

Be it known that I, CHESTER D. FLYNT, a citizen of the United States, residing at Brooklyn, in the county of Kings and State of New York, have invented certain new and useful Improvements in Journal-Boxes, of which the following is a specification.

My said invention relates to journal-boxes of the class designed to be self-lubricating; and it consists in the arrangement and combination of parts and materials hereinafter described and claimed whereby a bearing is provided which will not require oiling and at the same time will run with the least possible degree of friction and with no danger of heating.

Referring to the accompanying drawings, which are made a part hereof and on which similar letters of reference indicate similar parts, Figure 1 is a longitudinal central section through a journal-box embodying my invention; Fig. 2, a detail perspective view of the bearing-block, showing the bearing-face thereof, a portion with my improved lining, and a portion with said lining removed to show the means of attaching the same more clearly; Fig. 3, a cross-section through said bearing-block and journal-box on the dotted line 3 3 in Fig. 1, and Fig. 4 a perspective view of the lubricant-supply pad located beneath the journal.

In said drawings the portion marked A represents the journal; B, the box; C, the bearing-block, and D the lubricant-supply pad.

The journal and box shown are of the ordinary form used on railway-cars, to which my invention is particularly applicable and valuable, but, as will be readily seen, the bearing may be any journal-bearing such as ordinarily requires lubricating; and it will be understood that I do not limit my invention to use with a car-axle box, but regard it as relating to journal-bearings broadly.

The bearing-block C is of any form or material found suitable or desired for the purpose intended. In the form shown it is the ordinary bearing-block used in car-axle boxes. Its edges are preferably formed with grooves $c$, and its bearing-face is lined with a sheet of flexible asbestos $C'$, the edges of which are forced into said grooves $c$ and secured therein by adhesive material, such as shellac or material of a similar nature. Said sheet of asbestos is of somewhat loosely-woven character, and its pores are thoroughly filled and its surface covered with graphite or black-lead, (indicated by the reference-letter $c'$.) I have found that when so surfaced and protected the asbestos lining is able to resist all wear, frictional resistance is reduced to a minimum, a bearing is provided which generates no heat, and the use of oil, with all the consequent labor, expense, and disadvantage, is entirely obviated. In order to keep said lining supplied with the black-lead as it is worn away and prevent the asbestos surface from being worn, I provide the pad D beneath the bearing-block under the journal, it being mounted on a spring-base $D'$, which serves to hold the pad into constant contact with said journal. Said pad in its general form and arrangement is not materially different from pads which have heretofore been used to supply oil to the journal from a quantity contained in the box beneath it by capillary attraction, but its operation herein is entirely different. As shown, the surface of said pad is composed of a loosely-woven fabric. I have found a piece of ordinary "Brussels" carpet very suitable, the requirement being a surface which will contain as large a supply of the black-lead as possible and hold it from being taken up too freely and at the same time not be of a nature to create undue friction. Many soft porous substances will be found to meet these requirements and be suitable for the purpose. Said pad is made to be attached and detached from the spring-base by any suitable means, such as the hooks $d$. (Shown in Fig. 4.) By this arrangement when the charge of black-lead in one pad is exhausted it may be removed from said spring-base, another attached thereto, and the bearing thus put in good working condition again without removing the entire device.

In use, as already indicated, the asbestos lining $C'$ is thoroughly charged with the black-lead, it being rubbed into its pores and over its surface until said surface is completely protected and rendered perfectly smooth thereby. The pad D is filled with as large a charge of the black-lead as it will carry and arranged so that it will be directly beneath the bearing-block on the under side of the journal, with which it is held into constant contact by the spring-base D'. As the journal revolves it constantly takes up a small amount of said black-lead from the pad, and the same is wiped off by the asbestos lining, which is held onto its top surface with great force. Said lining is thus kept supplied with said black-lead or graphite until the supply in the pad is exhausted, when a new pad may be put in. A bearing is thus provided which will run for a long time without any attention whatever, will never get hot, and requires no oil.

A dust-ring A' is shown on the journal to prevent any dust or dirt from getting into the box, but as this forms no part of my present invention it will not be particularly described herein.

Having thus fully described my said invention, what I claim as new, and desire to secure by Letters Patent, is—

In a journal-box, the combination, of the journal, the bearing-block, a lining therefor consisting of asbestos fabric charged with graphite, a spring-base beneath the journal, and a pad mounted on said spring-base formed with a soft retaining-surface as described and containing a supply of said graphite, which is arranged to be held against the under surface of the journal by said spring-base, substantially as set forth.

In witness whereof I have hereunto set my hand and seal, at Washington, District of Columbia, this 19th day of September, A. D. 1896.

CHESTER D. FLYNT. [L. S.]

Witnesses:
E. W. BRADFORD,
L. A. HARTMAN.